A. PARSEY.
AIR ENGINE.
No. 5,205. Patented July 31, 1847.
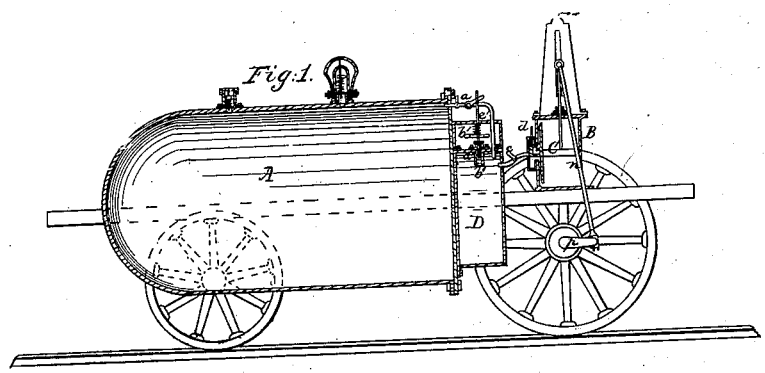
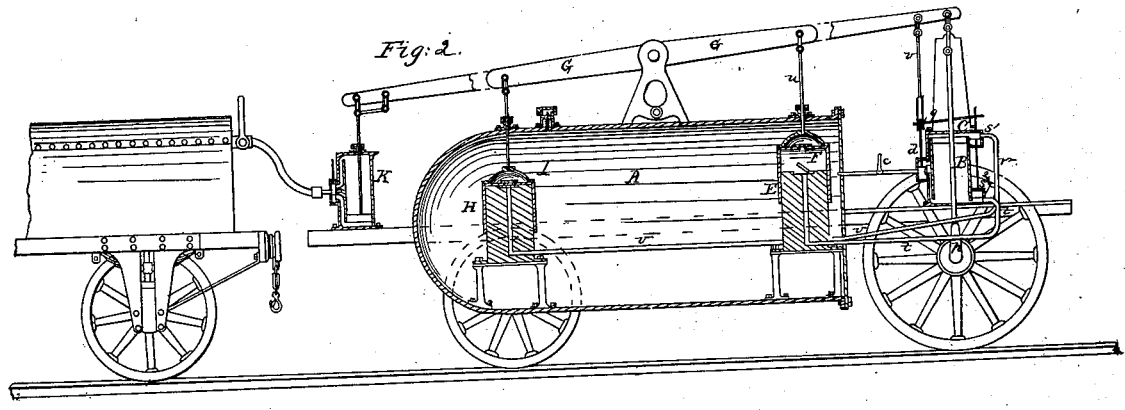
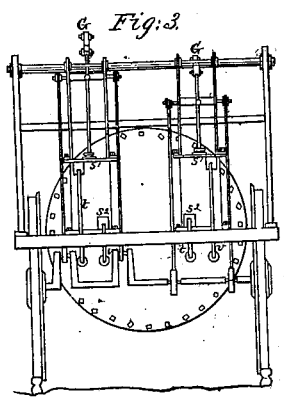
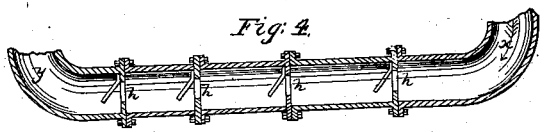
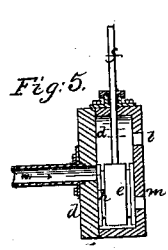
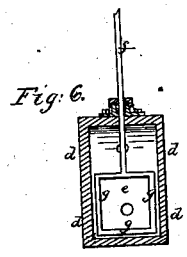
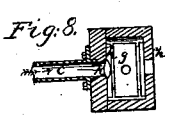

UNITED STATES PATENT OFFICE.

ARTHUR PARSEY, OF LEICESTER SQUARE, GREAT BRITAIN.

CONDENSED-AIR ENGINE.

Specification of Letters Patent No. 5,205, dated July 31, 1847.

*To all whom it may concern:*

Be it known that I, ARTHUR PARSEY, of No. 2 Spur street, Leicester Square, in the county of Middlesex and Kingdom of England, artist and scientific draftsman, a subject of the Queen of Great Britain, have invented Improvements in Obtaining Motive Power; and I do hereby declare that the following is a full and exact description of my said invention.

These improvements in obtaining motive power consist in certain modifications of machinery by means of which compressed air may be employed to work, without a vacuum, pistons, valves, levers, rods and other appendages for the purpose of producing mechanical force and communicating that force as a motive power for driving other machinery.

In the accompanying drawing Figure 1 is a longitudinal section taken through the middle of an engine upon wheels, constructed according to my improved plan which is intended to be employed as a locomotive engine upon a railway. A represents a strong iron vessel or receiver made perfectly air tight at all its joints, into which vessel I introduce atmospheric air by means of a forcing pump or otherwise until the air within the vessel has become greatly compressed and thereby acquired a very considerable elastic force or power. I propose in some cases to provide vessels previously filled with compressed air and to transfer the air from such vessels in its compressed state into the receiver A by which means the receiver may from time to time be replenished with compressed air instead of injecting the air immediately into it by a force pump. B is a cylinder formed as the working cylinder of a steam engine containing a piston C which is intended to be worked up and down within the cylinder by the elastic force of compressed air. The compressed air from the receiver (A) passes on its way to the cylinder through a chamber (D) where it expands preparatory to its entrance in the cylinder (B) that the air may act on the piston with the same force during the entire operation of the engine, which would not be the case if it were permitted to go directly from the receiver into the cylinder, as the air at the commencement is much more dense than toward the end. There is a cylinder ($a'$) in the upper end of the chamber (D) to which is fitted a piston or valve ($b$) having a spring ($b'$) that forces it down with a given force according to the degree of tension given to it by the regulating screw ($c'$). The rod ($e'$) of this piston or valve is connected with the handle of the throttle valve in the pipe ($a$) so that when the pressure of the air in the chamber is above the standard required for working the engine the piston is forced up which closes the throttle valve to arrest the passage of air from the receiver into the chamber, and the moment the pressure is reduced below the standard the piston is forced down by the spring to open the trottle and admit more air; in this way the proper standard can be preserved until the air in the receiver is reduced below the standard. I would remark however that in some cases the chamber D may be dispensed with and the compressed air allowed to pass directly from the receiver to the working cylinder. The compressed air from the receiver A being admitted into the chamber D is thence allowed to pass by a pipe and cock $c$ to the valve box $d$. The reciprocal action of the sliding valve is effected by the usual means by which slide valves are worked in order that the compressed air may be admitted into the working cylinder reciprocally above and below the piston as in the working of ordinary steam engines. The peculiar construction of the slide valve and its box for admitting the compressed air into the cylinder and letting it off after it has acted upon the piston is shown upon an enlarged scale in the several sectional representations of the valve box detached at Figs. 5, 6, 7 and 8. The thickness or substance of the box is shown at $d, d,$ in which $e,$ the slide valve is moved up and down by its rod $f$. Figs. 5 and 6 supposed to be connected above to the ordinary reciprocating tappet apparatus of the engine. The slide valve is formed by a rectangular frame $g, g, g, g,$ seen in Fig. 6 with two plates $h, h,$ shown in Fig. 7, their faces being ground accurately flat so as to fit close and air tight against the inner sides of the valve box $d$, and there are springs $i, i,$ placed between these plates which force them outward and keep them in close contact with the inner sides of the box. A vertical channel is formed in one of the side plates seen at $h,$ in Fig. 8 by which the compressed air from the pipe $c$ passes both upward and downward into the valve box. There are two openings one above the other in the opposite side of the valve box at $l$, and $m$, Fig. 5, by which the compressed air is admitted into the cylinder B. When the slide valve is depressed as in Fig. 5 the air passes through $l$ and acts upon the upper surface of the piston C the lower opening $m$ being then closed but when the slide valve is raised the upper opening $l$ becomes closed and the lower one $m$ opened by which the air is admitted to the under surface of the piston. By means of the reciprocating action of the slide valve the compressed air is enabled alternately to raise and depress the piston the air escaping after each stroke as in high pressure-steam engines. The movements of the piston effected by these means are communicated through the piston rod to the connecting rod $n$, and thence to the crank $p$, by which the front running wheels of the carriage are made to revolve and hence the carriage impelled forward upon the railway. One or more corresponding working pistons and cylinders with the appendages of the same construction may be placed along side of that exhibited in the drawing Fig. 1 as represented in the end view Fig. 3 observing that the stroke of one of the pistons must be regulated so as to act at the dead points of the other for the purpose of producing as near as may be an uniform impelling force.

In order to economize the compressed air I propose under some circumstances instead of allowing it to blow off like the steam of a high pressure engine, to return the compressed air into the receiver A after it has acted upon the piston. This I effect by the arrangement shown in Figs. 2 and 3. Fig. 2 is a longitudinal section of a locomotive engine. Fig. 3 is an end view of the same. A is the vessel or receiver as before filled with compressed air by the means above stated. $c$, is the pipe and cock by which the compressed air is admitted into the valve box $d$, and by the slide valve let off into the cylinder B to act alternately upon the upper and lower surfaces of the piston C as before explained. To the apparatus that works the slide valve represented in Fig. 2 one end of a lever $q$, is attached which is connected at the other end to a vertical rod $r$, whereon the slides of the valves $s$, 1, $s$, 2, are fixed that open and close the eduction passages. On the working piston rising to the top of the cylinder the arrangement of the valves will cause the lower eduction aperture at $s^2$, to be opened, when the air in the cylinder instead of blowing off will pass by a pipe $t$, to a peculiar construction of pump placed within the compressed air receiver A. This pump is formed by a cylindrical block E fixed upon a standard and has a tube or passage through it with a valve at top opening upward. Upon the block E a cylindrical sliding cap F is placed with a valve in its top opening upward. This cap which I prefer to be of equal capacity with the cylinder or nearly so is made to fit air tight by packing round the upper edge of the block and is raised and depressed by a sliding rod $u$, passing through a stuffing box and attached at top to a lever G. This lever may be worked by hand or by any other means and the cap F being raised at the moment that the lower eduction passage $s^1$, is opened the valve on its top will close and the air pass from the cylinder under the piston C through the pipe $t$, and the passage in the block E into the space produced in the cap F as it rises. On the descent of the piston C in the cylinder B the transfer of the condensed air from the cylinder into the cap F takes place and causes the cap to be occupied with the air but when the piston C again rises the cap F will be made to descend and the lower eduction passages $s^2$, in the cylinder being closed the air cannot return, but is forced through the opening valve out of the cap F into the receiver A. Another block H of precisely the same character as that at E is also fixed within the condensed air receiver A having a similar cylindrical cap sliding upon it which cap I is intended to receive eduction passages $s^2$, in the cylinder being from the cylinder B on the upper side of the piston C. From the upper eduction aperture $s$ 1, a pipe $v$, extends which passes through the block H for the purpose of carrying the discharged air from the working cylinder into the cap I. Hence it will be perceived that in accordance with the action of the piston C in the working cylinder B the caps F and I will be made to reciprocate and thereby draw off the volumes of condensed air above and below the piston and force the volumes of air in their condensed state into the receiver A to be passed again through the pipe $c$, and valve box $d$, into the cylinder and employed for keeping up the continued action of the piston.

The lever G may be elongated in front and connected in the usual way of connecting a beam with the working piston as shown in Figures 2 and 3 and to this lever may also be attached the rod $u$ for working the slide valves in the way shown as well for working the caps above described. The lever G it has been said may be actuated by hand or other means for raising and depressing the caps F and I but it may be desirable for this purpose to employ a small steam engine as shown at K placed at the back part of the carriage in Fig. 2. In that case the hinder part of the lever G must be elongated and the piston of the small steam engine attached to it by which the vibrating action of the lever G shall be effected.

Fig. 4 represents in section a portion of one of the pipes $t$, or $v$, by which the condensed air is conducted back from the cylinder to the receiver. In this pipe I place a series of valves $z\ z\ z$ each acting as a stop to prevent the air passing from the receiver to the cylinder and which may be placed at equal or unequal distances apart but I prefer to place them at unequal distances so that the capacity of the chamber may increase from the receiver toward the cylinder.

I will observe that several smaller receivers may be combined instead of one large receiver from whence the chamber D may be charged with condensed air or from whence the air may pass directly to the working cylinder or cylinders. This improved engine may also be employed to produce a stationary power for working other machinery.

I claim as my invention—

The chamber provided with the spring valve or piston to regulate the elastic force of the air as it passes from the receiver to the cylinder, in combination with the induction passage or passages, as described.

In witness whereof I the said ARTHUR PARSEY have hereto set my hand and seal this thirteenth day of September in the year of our Lord one thousand eight hundred and forty five.

ARTHUR PARSEY. [L. S.]

Witnesses:
 A. V. NEWTON,
 J. W. MOFFATT.